July 25, 1972

R. C. ROPP 3,679,452

PROCESS FOR COATING LEHRING-SENSITIVE PHOSPHOR
ONTO LAMP ENVELOPE

Original Filed April 2, 1967

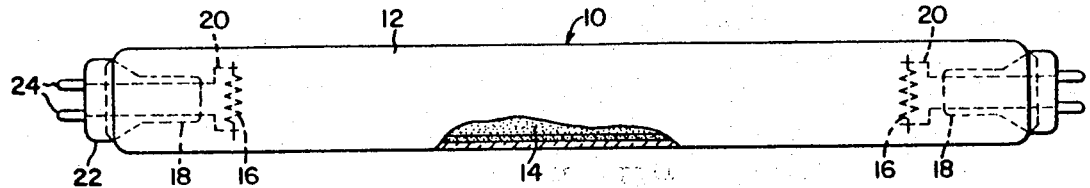

FIG.1.

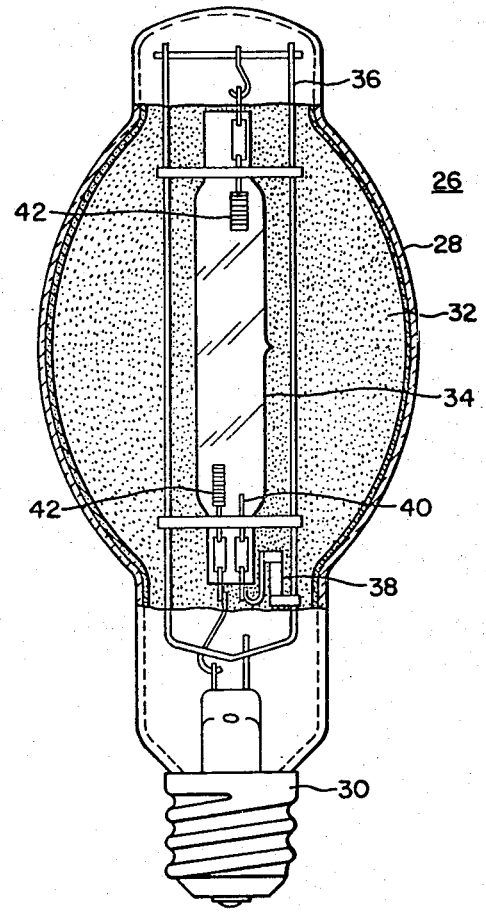

| SUSPEND FINELY DIVIDED PHOSPHOR IN LIQUID VEHICLE WHICH INCLUDES BINDER MATERIAL, AND INCLUDING ALSO A SMALL AMOUNT OF HEAT-DECOMPOSABLE AMMONIA COMPOUND |

| COAT SUSPENSION ONTO LAMP ENVELOPE |

| HEAT COATED ENVELOPE TO DECOMPOSE BINDER MATERIAL AND AMMONIA COMPOUND |

WITNESSES

Theodore F. Wrobel

James F. Young

INVENTOR
Richard C. Ropp

BY
W. D. Palmer
ATTORNEY

United States Patent Office 3,679,452
Patented July 25, 1972

---

3,679,452
PROCESS FOR COATING LEHRING-SENSITIVE PHOSPHOR ONTO LAMP ENVELOPE
Richard C. Ropp, North Caldwell, N.J., assignor to Westinghouse Electric Corporation, Pittsburgh, Pa.
Continuation of abandoned application Ser. No. 620,074, Apr. 2, 1967. This application Jan. 28, 1971, Ser. No. 110,744
Int. Cl. B44d 1/02; H01j 61/35
U.S. Cl. 117—33.5                              3 Claims

ABSTRACT OF THE DISCLOSURE

For coating lamp envelopes with phosphor which normally is sensitive to lehring, a small amount of room-temperature-stable, metal-free, ammonia-radical-containing compound which will decompose on heating to release ammonia gas is included in the phosphor paint. The paint also includes a small amount of organic binder material. When the coating paint is lehred after application to decompose the organic binder, the ammonia compound also decomposes to release ammonia gas which preserves the desired valence state of the activator in the phosphor. The finished discharge lamp has improved performance.

---

This application is a continuation of application Ser. No. 620,074, filed Apr. 2, 1967, now abandoned.

BACKGROUND OF THE INVENTION

This invention relates to phosphor materials and, more particularly, to a process for coating phosphor materials which normally are sensitive to the lehring operation which forms a part of the coating process.

In order to obtain best performance for some phosphor materials, it is necessary to fire the raw-mix constituents in a slightly reducing atmosphere, apparently to control the valence of the phosphor activator. Such phosphors are normally orthophosphates or other phosphates which include as activator cuprous copper, or stannous tin, or mixtures thereof. An alkaline-earth metal plus rare-earth metal orthophosphate is disclosed in U.S. Pat. No. 3,025,423, dated Mar. 13, 1962. Orthophosphate phosphor activated by stannous tin is disclosed in U.S. Pats. No. 2,919,365, dated Dec. 29, 1959 and No. 3,110,680, dated Nov. 12, 1963. Orthophosphate phosphor which is activated by both cuprous copper and stannous tin is disclosed in U.S. Pat. No. 3,143,510, dated Aug. 4, 1964. When such phosphors are coated onto the interior surface of a discharge lamp envelope, they are normally suspended as a paint in a vehicle such as xylol which has dissolved therein a small amount of ethylcellulose binder material. The phosphor paint is flushed or flowed over the envelope surface to be coated, the vehicle dried, and the coated envelope then lehred in air at a temperature of approximately 1200° F. for approximately one minute, in order to decompose and volatilize the binder. Since the phosphor is initially prepared by firing the raw-mix constituents in the slightly reducing atmosphere, the lehring in air somewhat lowers the output of the phosphor, as measured by that output which should reasonably be expected. It is theorized that this decrease in output is due to some oxidation of a part of the activator.

Some other phosphors which are prepared in other than an oxidizing atmosphere also display a sensitivity to lehring. Examples are calcium-cerium-manganese phosphate, which is prepared by firing in hydrogen. Still another example is strontium-calcium pyrophosphate activated by tin and this phosphor is prepared by firing in a slightly reducing atmosphere. The performance of any of these phosphors is not as good as should reasonably be expected, because of the lehring operation.

SUMMARY

It is the general object of the present invention to provide a method for coating onto a discharge lamp envelope finely divided particles of phosphor which is normally sensitive to lehring, in order to improve the performance of the discharge lamp which incorporates such phosphor.

It is another object to provide a method for coating onto a discharge lamp envelope finely divided particles of phosphate phosphors which include cuprous copper, or stannous tin, or both as activator, in order to prevent a decrease in phosphor output which is normally manifested immediately after the envelope lehring operation.

The aforesaid objects of the invention, and other objects which will become apparent as the description proceeds, are achieved by suspending the phosphor to be coated as a slurry in a liquid vehicle which contains a small amount of heat-decomposable organic binder material, and including throughout the slurry a small amount of room-temperature-stable, metal-free, ammonia-radical, containing compound which will decompose to release ammonia gas when heated to the temperature required to decompose the binder material. The ammonia-radical portion of the ammonia compound constitutes from 0.003% to 0.2% by weight of the lehring-sensitive phosphor. The slurry is applied to the lamp envelope surface to be coated, and after coating, the vehicle is volatilized and the coated envelope is heated to a temperature sufficient to decompose the organic binder material and also decompose the ammonia compound.

BRIEF DESCRIPTION OF THE DRAWINGS

For a better understanding of the invention, reference should be had to the accompanying drawings wherein:

FIG. 1 is an elevational view, partly broken away, illustrating a fluorescent lamp which incorporates phosphor coated in accordance with the present invention;

FIG. 2 is an elevational view, partly broken away, illustrating a high-pressure mercury-vapor lamp which incorporates phosphor coated in accordance with the present invention; and FIG. 3 is a flow diagram illustrating the basic steps of the present method.

DESCRIPTION OF THE PREFERRED EMBODIMENTS

With specific reference to the form of the invention illustrated in the drawings, the numeral 10 in FIG. 1 illustrates a fluorescent lamp comprising a tubular, vitreous envelope 12 coated internally with phosphor 14 which has been coated in accordance with the present invention. Sealed at each end of the envelope 12 are mounts, each comprising an electrode 16, re-entrant stem press 18, and lead-in- conductors 20. Base caps 22 and base pins 24 are provided at the envelope ends.

In FIG. 2 is shown a high-pressure, mercury-vapor lamp 26, which comprises a radiation-transmitting outer envelope 28 having a conventional screw-type base 30 connected thereto. The phosphor which is coated in accordance with the present invention is included as a layer 32 on the inner surface of the outer envelope 28. An arc tube 34 is supported within the outer envelope 28 by means of a conventional supporting frame 36. The starting resistor 38 connects a starting electrode 40 to one side of the energizing potential and, during operation, the mercury arc is sustained within the arc tube 34 between operating electrodes 42.

The basic steps of the present method for coating the phosphor onto the discharge lamp envelope are shown in the flow diagram of FIG. 3. As a specific example, 150 kilograms of strontium-magnesium orthophosphate which is activated by stannous tin is suspended in 200 liters of a liquid vehicle such as xylol which has a small amount of organic binder added thereto, in order to control the viscosity of the resulting paint. Vehicles other than xylol can also be used, as is known in the art. This paint is thus in the form of a slurry wherein the liquid vehicle has the phosphor suspended therein. As an example, 3% by weight of ethyl cellulose binder is included in the paint and other known binders can be substituted for the ethylcellulose. There is also included in the paint a small amount of room-temperature-stable, metal-free, ammonia-radical-containing compound which will decompose to release ammonia gas when heated to the temperature required to decompose the binder material. In accordance with the present invention, the ammonia-radical portion of the ammonia compound constitutes from 0.003% to 0.2% by weight of the phosphor to be protected. More specifically, the ammonia compound can comprise one or more of ammonium mono-hydrogen orthophosphate, ammonium dihydrogen orthophosphate, tri-ammonium orthophosphate, ammonium oxalate, ammonium bicarbonate, ammonium carbonate, ammonium acetate, and ammonium chloride. It is preferred to use ammonium mono-hydrogen orthophosphate in amount of 0.05% by weight of the phosphor. The orthophosphate is in finely divided form with an average particle size of about 12 microns, although the state of division is not critical. The coating suspension or paint is then flushed or flowed over the lamp envelope surface to be coated and the coated envelope is then lehred by heating in an air atmosphere at a temperature of approximately 1200° F. for about one minute. The xylol volatilizes rapidly and the heating decomposes and volatilizes the organic binder material to leave the phosphor adhered to the inner surface of the envelope. During the heating, the ammonia compound also decomposes to release ammonia gas which is slightly reducing in nature and this preserves the valence state of the phosphor activator.

The present method can be used to coat single phosphor materials which are normally sensitive to lehring and the present method can also be used to coat mixtures or blends of phosphors which include as a component such normally lehring-sensitive phosphor materials. As a specific example, a blend of 41.4% by weight strontium-magnesium orthophosphate activated by 0.85% by weight of stannous tin, 42% by weight of blue-white halophosphate, 14.9% by weight of blue halophosphate, and 1.7% of zinc silicate activated by manganese constitutes a so-called deluxe blend of phosphor material for a fluorescent lamp. The ammonia compounds can be incorporated into the coating paint with the amount used calculated on the basis of the amount of the stannous-tin activated phosphor which is incorporated into the blend. In a 40 watt lamp, the resulting blend displays a 100-hour output which is approximately 80 lumens greater than a control lamp incorporating identical phosphors which are not coated in accordance with the present invention.

The ammonia compound which is added to the coating paint can be mixed with the phosphor before it is suspended in the paint or can be dispersed in the paint simultaneous with the phosphor. Alternatively, the ammonia compound can be added to the coating paint after the phosphor is suspended therein. It is only required that the ammonia compound be included in the paint before the phosphor is coated onto the envelope.

It will be recognized that the objects of the invention have been achieved by providing a method for coating discharge device envelopes with phosphor which is normally sensitive to lehring in order to improve the performance of the finished lamp. Such phosphor is normally a phosphate and includes at least one of cuprous copper and stannous tin as activator.

While preferred examples have been illustrated and described in detail, it is to be particularly understood that the invention is not limited thereto or thereby.

I claim as my invention:

1. The method of coating onto a lamp envelope finely divided particles of alkaline-earth metal orthophosphate phosphor which is activated by at least one of cuprous copper and stannous tin and which is normally sensitive to lehring, in order to improve the performance of the finished lamp, which method comprises:
    (a) suspending said phosphor as a slurry in a liquid vehicle which contains a small amount of heat-decomposable organic binder material, and including throughout said slurry a small amount of room-temperature-stable, metal-free, ammonia-radical-containing compound which will decompose to release ammonia gas when heated to the temperatures required to decompose said binder material, with the ammonia radical portion of said ammonia compound constituting from 0.003% to 0.2% by weight of said phosphor, and said ammonia compound consists of at least one of ammonium mono-hydrogen orthophosphate and ammonium di-hydrogen orthophosphate;
    (b) applying said slurry to the lamp envelope to be coated; and
    (c) volatilizing said vehicle and then heating said coated envelope to a temperature sufficient to decompose said organic binder material and to decompose said ammonia compound.

2. The method as specified in claim 1, wherein said ammonia compound is included throughout said slurry in the form of finely divided particles, and said vehicle is a volatile organic liquid.

3. The method as specified in claim 1, wherein said ammonia compound is ammonium mono-hydrogen orthophosphate or ammonium di-hydrogen orthophosphate and is used in amount of about 0.05% by weight of said phosphor.

References Cited

UNITED STATES PATENTS 2,647,066   7/1963   Homer _____ 117—33.5

RALPH S. KENDALL, Primary Examiner

C. WESTON, Assistant Examiner

U.S. Cl. X.R.

117—46 CA; 313—108, 109